United States Patent [19]
Capper et al.

[11] Patent Number: 5,453,023
[45] Date of Patent: Sep. 26, 1995

[54] TERMINAL BLOCK FOR INTERCONNECTING AN UNINSULATED CONDUCTIVE LEAD PORTION TO ANOTHER CONDUCTOR

[75] Inventors: Harry M. Capper, Harrisburg; James W. Robertson, Oberlin, both of Pa.

[73] Assignee: The Whitaker Corporation, Wilmington, Del.

[21] Appl. No.: 210,870

[22] Filed: Mar. 18, 1994

Related U.S. Application Data

[62] Division of Ser. No. 880,449, May 8, 1992, Pat. No. 5,321,577.

[51] Int. Cl.$^6$ .................................................. H01R 4/24
[52] U.S. Cl. ........................... 439/410; 439/723; 439/725
[58] Field of Search ..................... 439/395–413, 439/417–419, 725, 374, 438–441, 492, 709–715, 780, 787, 796

[56] References Cited

U.S. PATENT DOCUMENTS

| | | | |
|---|---|---|---|
| 2,908,884 | 10/1959 | Wirsching | 439/409 |
| 2,975,392 | 3/1961 | Ludwig | 439/409 |
| 3,071,750 | 1/1963 | Heselwood | 339/97 |
| 3,249,908 | 5/1966 | Fuller et al. | 339/98 |
| 4,039,239 | 8/1977 | Cobaugh et al. | 339/97 R |
| 4,060,296 | 11/1977 | Kunkle et al. | 339/17 CF |
| 4,089,041 | 5/1978 | Lockard | 361/403 |
| 4,152,686 | 5/1979 | Hughes | 336/192 |
| 4,166,265 | 8/1979 | Reynolds et al. | 336/192 |
| 4,405,188 | 9/1983 | Schwartz | 339/17 CF |
| 4,428,633 | 1/1984 | Lundergan et al. | 339/17 CF |
| 4,490,004 | 12/1984 | Lawrence et al. | 339/95 R |
| 4,557,544 | 12/1985 | Esser | 339/97 R |
| 4,624,518 | 11/1986 | Seidel | 339/97 P |
| 4,742,541 | 5/1988 | Cwirzen et al. | 379/412 |
| 5,006,077 | 4/1991 | Loose et al. | 439/409 |
| 5,120,245 | 6/1992 | Robertson et al. | 439/395 |
| 5,154,639 | 10/1992 | Knoll et al. | 439/620 |
| 5,167,526 | 12/1992 | Pinyan et al. | 439/411 |
| 5,219,302 | 6/1993 | Robertson et al. | 439/404 |

OTHER PUBLICATIONS

AMP Catalog No. 82257, "AMP Quiet Front Terminal Block," Issued Sep. 1991; six pages; AMP Incorporated, Harrisburg, Pennsylvania.
U.S. application Ser. No. 07/863,626 filed Apr. 3, 1992; (Abstract and Drawings only, included).

*Primary Examiner*—David L. Pirlot
*Attorney, Agent, or Firm*—Anton P. Ness

[57] ABSTRACT

A single modular assembly (10) has two terminals (18) in housing cavities (28) each with a pair of slots (38) for termination by rotary actuation to respective conductors of two cables, for crossconnecting or splicing the tip and ring lines of a customer's service line with those of a cable extending to the main distribution line. Each terminal (18) is in electrical engagement with a circuit wire (40) extending to a separate portion (20) of the module for electrical connection to an active electrode of a protector element (24). The two protector elements (24) each include a ground electrode (76) grounded to a common ground strap (54) which includes a contact section (60,64) exposed along the bottom of the module to be assuredly engaged with a ground strap (122) along the floor (112) of the enclosure (110) upon mounting of the module (10) therein, for grounding to a ground stud for external system grounding.

8 Claims, 4 Drawing Sheets

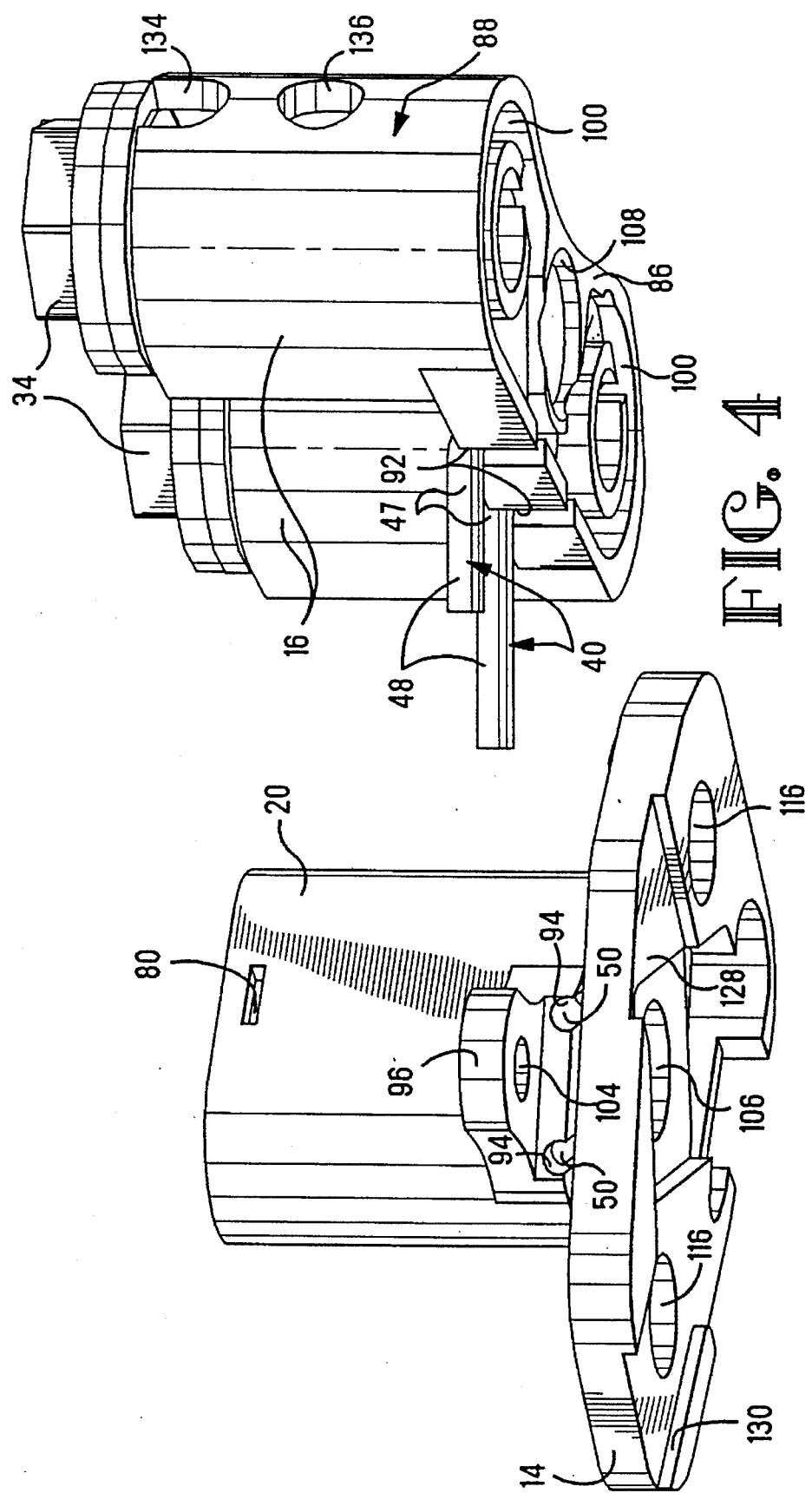

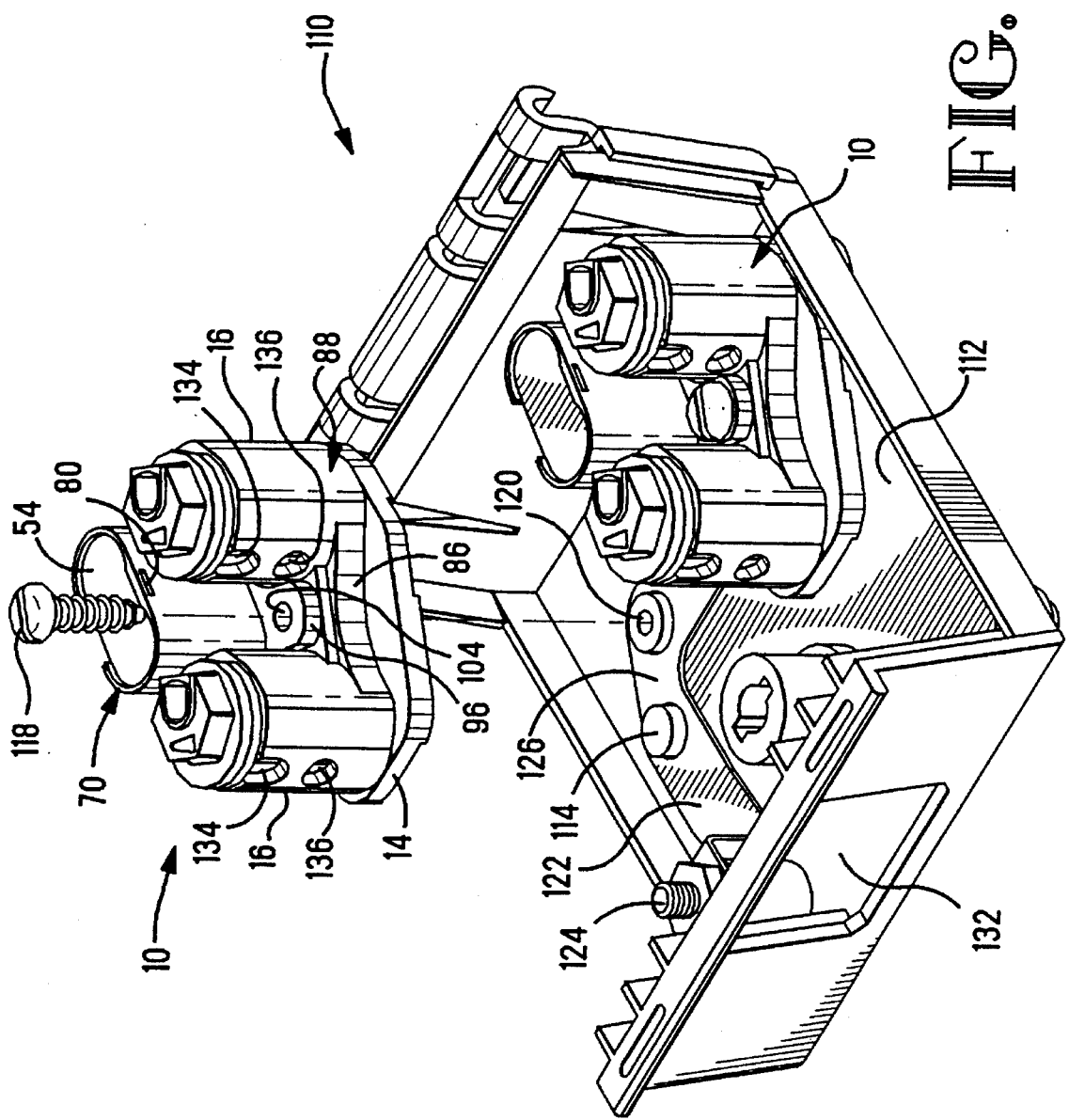

TERMINAL BLOCK FOR INTERCONNECTING AN UNINSULATED CONDUCTIVE LEAD PORTION TO ANOTHER CONDUCTOR

REFERENCE TO RELATED APPLICATION

This is a divisional of U.S. patent application Ser. No. 07/880,449 filed May 8, 1992, now U.S. Pat. No. 5,321,577.

FIELD OF THE INVENTION

This relates to the field of electrical connectors and more particularly to connectors for connecting pairs of signal wires together.

BACKGROUND OF THE INVENTION

In the telecommunications industry, telephone cable is introduced to individual telephone sites such as residences, mainly through use of a splice of the signal wires of the cable to respective house wires at a junction located outside or inside the house. The junction is housed within a protective enclosure which is mounted usually to an outside wall of the house. One example of an assembly of a splice terminal block and self-sealing enclosure therefor is disclosed in U.S. Pat. Nos. 5,219,302 and 5,145,388, both assigned to the assignee hereof. Therein, a terminal block has a single-piece barrel-shaped terminal with connecting sections for both wires to be spliced, and the terminal is of the insulation piercing or displacement type which eliminates the need for stripping the insulation from the signal wire conductors. A dielectric housing includes an integrally molded center post within a tubular terminal-receiving housing section, both coextending from a common base section and defining an annular cavity, the housing section providing wire-receiving openings through side walls and into the cavity aligned with an aperture through the center post, enabling insertion of wire ends during splicing.

A barrel-shaped terminal and an associated lug-capped tubular actuator is then assembled to the housing, with the barrel terminal surrounding the center post within the cavity and having apertured insulation displacement contact sections which are initially aligned with the wire-receiving openings of the housing and center post, and the actuator also having profiled apertures therethrough extending partially around the circumference and also aligned with the wire-receiving openings of the housing, center post and terminal. The lug extends above the housing upon assembly to be accessible to tooling for rotation thereof to rotate the actuator and the terminal.

During splicing the wire ends of both wires are inserted into respective openings and through the apertured contact sections until abutting stop surfaces of the housing which then holds the wire ends at two spaced locations, both outside and within the terminal wall; the actuator is then rotated through an angular distance of about a quarter turn in turn rotating the terminal, and the constricted edges of a precisely profiled slot extending from each of the terminal's apertures penetrate the wire insulation of both wires simultaneously and engage the conductors therewithin, completing the splice.

The terminal blocks of U.S. Pat. No. 5,219,302 are modular in nature, comprising a pair defined in the same housing member for mounting within an enclosure adapted for a plurality of such modules. The two-terminal block housing is mountable in a selected orientation such that the wire-receiving openings of each of the terminal blocks are oriented facing a cable exit of the enclosure, or other common point from where the pairs of conductors originate as discrete wires from two cables.

It is desired to provide the telephone line to a particular customer with overvoltage protection on the circuits which protect the circuits of the customer's equipment from energy surface, such as from lightning strikes and the like. Several examples of protector elements are disclosed in U.S. Pat. Nos. 4,158,869; 4,161,762; and 4,133,019. Modules containing such protectors are disclosed in U.S. Pat. Nos. 4,742,541; 4,159,500; 4,613,732 and 4,675,778. The telecommunications industry has established standards for performance and certain dimensional and design requirements for such protectors; one example is Bellcore Technical Reference No. TR-TSY-000070, Issue 1, February 1985, entitled "Customer Station Gas Tube Protector Units".

There is disclosed in U.S. Pat. No. 5,296,646 and assigned to the assignee hereof, a protector module for a telephone line junction box and a method of protecting a circuit. A module contains an array of protectors removably contained therein, where the module includes a housing of dielectric material defining protector-receiving cavities into which respective protectors are insertable. The module includes a ground plate disposed across the upper face of the housing body and includes a plurality of openings aligned with the cavities to define the peripheries of the plurality of cavities to become electrically engaged with a ground electrode of each protector. In one embodiment a first contact is mounted at the bottom of each cavity and includes a first contact section on a spring arm exposed within the cavity for electrical engagement with an active electrode on the bottom of the protector upon protector insertion. A second contact section extends below the base of the housing to be easily terminatable to an associated conductor wire of a stub cable of the main distribution line which then extends along the base of the housing to the housing of another module for termination to a terminal which splices the conductor wire to a conductor of the service wire, as in U.S. Pat. No. 5,006,077, after which the exposed stub cable conductor wires and the second contact sections are potted and environmentally sealed. The ground plate is commoned to a ground stud of the enclosure for commoning to a system ground.

It is desired to provide a module for a pair of signal wires of a customer line with protector elements which can be assembled within an enclosure such that each protector is electrically connected in-line for the circuits interconnected by the terminals of the terminal block contained within the enclosure, upon termination of a service wire to a terminal.

It is desired that such module permit in-line circuit protection simultaneously with splicing of the pair of wires of the service line.

SUMMARY OF THE INVENTION

The present invention is a single module having two barrel-shaped terminals each with a pair of insulation displacement slots for termination by rotary actuation to respective conductors of two cables, for crossconnecting or splicing the tip and ring lines of a service line extending to a customer with a cable extending to the main distribution line. Each barrel terminal is in electrical engagement with a circuit element such as a wire length extending to a respective separate portion of the module for electrical connection to an active electrode of a respective protector element within a respective housing section. The two protector elements each include a ground electrode grounded to a common ground strap which includes a contact section exposed along the bottom of the module to be assuredly engaged with a ground strap along the floor of the enclosure upon mounting of the module therein, for grounding to a ground stud for external system grounding. The wire-receiving apertures of the two housing sections containing the terminals are preferably oriented to face a cable exit of the enclosure to facilitate receipt of the conductors for wire termination upon rotation actuation of the terminals by respective lug-capped actuators.

An enclosure for protected terminal blocks or modules of the present invention includes a ground strap extending from a ground stud to each terminal block mounting region, enabling the contact section of the module ground strap to engage its top surface upon mounting of the terminal block in position.

In a separate aspect of the invention, a terminal block arrangement includes a terminal disposed within a housing with the terminal including a section to be terminated to a conductor such as through insulation displacement upon insertion of the conductor into an opening into the housing and manipulation of the terminal relative to the conductor. A groove is defined along an inner surface of the housing opposing a groove-proximate surface of the terminal and extends from a lead-receiving opening into the housing into which an uninsulated end portion of a lead is insertable, so that the lead portion when disposed along the groove is held in compression against the surface of the terminal and is in electrical connection therewith, with the housing holding the terminal so that the groove-proximate surface is a selected spacing from the groove. The terminal thus electrically connects the uninsulated lead portion to the conductor when the conductor is terminated to the terminal.

It is an objective of the present invention to provide a single assembly adapted to receive and crossconnect ends of service and distribution tip and ring conductors and include integrally therewithin protection of the circuits thus defined against overvoltage.

An embodiment of the present invention will now be described by way of reference to the accompanying drawings.

BRIEF DESCRIPTION OF THE DRAWINGS

FIG. 4 is an isometric view of the terminal module being joined with the protector housing, with via wires coextending from the terminal module to be received into openings of the protector housing; and FIG. 5 is an isometric view of a protector module being mounted within an enclosure and ready for receipt of service and distribution cable conductors for termination to complete a protected customer telephone line.

DETAILED DESCRIPTION OF THE PREFERRED EMBODIMENT

Figure 1:
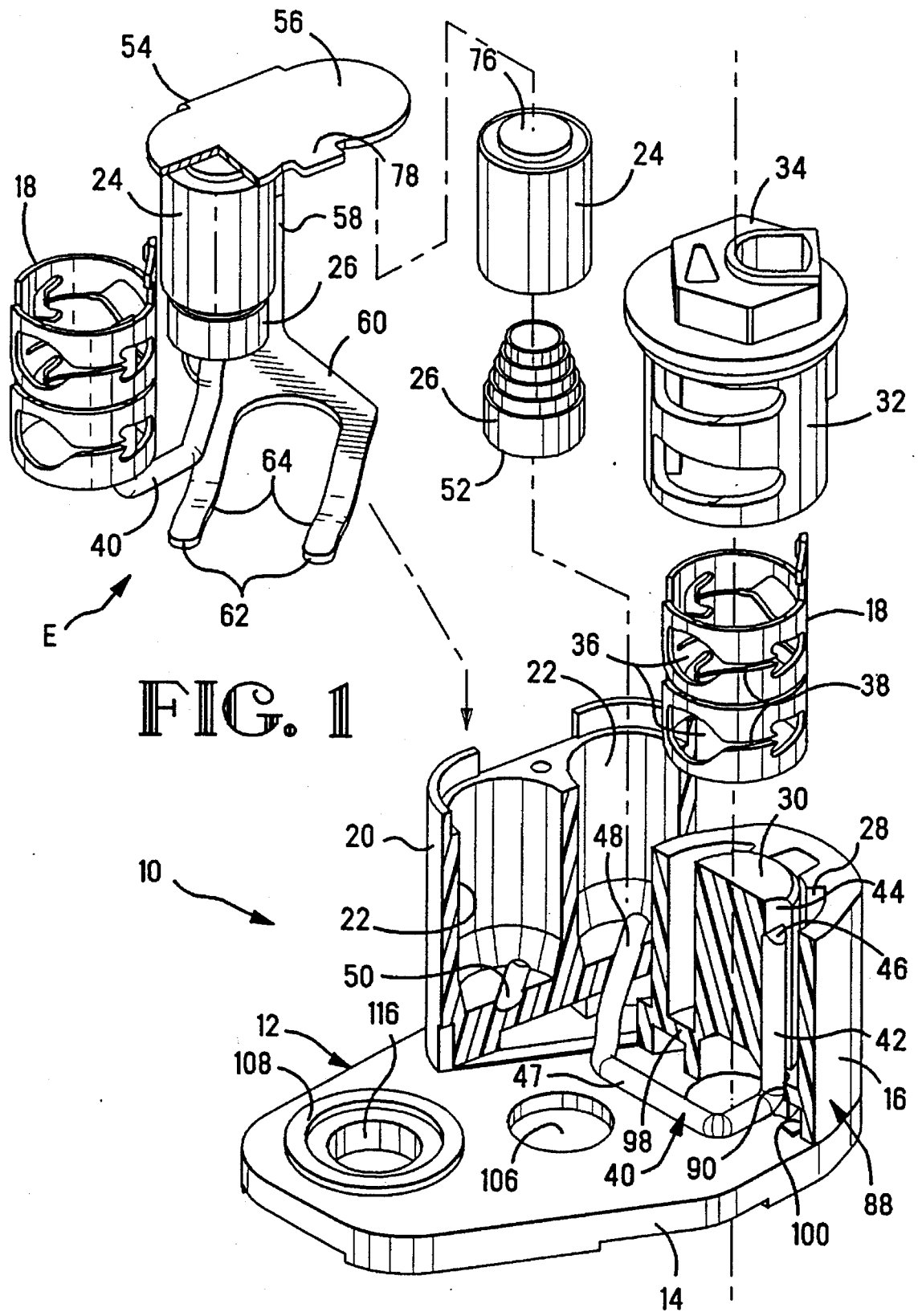
FIG. 1 is an exploded view of the components of the protector module of the present invention, with a portion of the module housing broken away to illustrate the interior of cavities thereof and one of the terminals and actuators ready for receipt into a cavity and associated protector ready for receipt into a respective cavity, and circuit wire in position, and with the other terminal, circuit wire, protector and ground strap positioned together to illustrate the electrical relationship therebetween.

Protector module 10 of the present invention includes a housing assembly 12 including a base section 14, a pair of housing sections 16 for respective barrel terminals 18, and a protector housing section 20. Protector housing section 20 preferably is molded to be integral with base section 14 and includes a pair of cavities 22 for receipt of protector elements 24 and coil springs 26 thereinto during final stages of protector module assembly. Each housing section 16 has an annular cavity 28 therein about a center post 30, into which is inserted a barrel terminal 18 to surround the center post, and thereafter is inserted an actuator 32 having a lug-shaped cap 34 adapted to be rotated by a tool to rotate terminal 18 for termination to two wires (not shown) inserted through respective apertures 134,136 (see FIG. 5) of the housing section walls, through openings 36 of the terminal and at least into apertures of the center post all coaligned, which causes profiled slots 38 extending from the openings of the terminal to penetrate the wire insulation and electrically engage both wires thereby interconnecting them.

An uninsulated via or circuit wire 40 is disposed in housing assembly 12 to extend between each terminal 18 and into each cavity 22 of protector housing section 20, to interconnect the terminal ultimately to a respective protector 24. Each circuit wire 40 includes a first end section 42 extending through an entrance opening 90 and within and along the bottom of a groove 44 vertically along center post 30 to a beveled free end 46, and also includes an intermediate section 47 and a second end section 48 extending into cavity 22 and in a groove 50 along the bottom of cavity 22. First end section 42 protrudes partially out of groove 44 to engage the inside surface of terminal 18 in intimate contact therewith when terminal 18 is inserted into annular cavity 28 upon full assembly, with beveled free end 46 facilitating initial bearing engagement with the bottom edge of a terminal 18 upon insertion of terminal 18 into cavity 28 and over first end section 42 without stubbing. Second end section 48 protrudes above groove 50 to be engaged by bottom 52 of coil spring member 26 inserted into cavity 22, which in turn engages a portion of the bottom of protector 24. A module ground strap 54 includes a cover portion 56 which extends across the tops of both cavities 22 to engage the top of both protectors 24 upon full assembly, a vertical section 58 which extends along the outside of protector housing section 20 to a bifurcated bottom section 60. Bottom section 60 includes two tines 62 which extend to free ends having downwardly arcuate contact sections 64, all as is illustrated in the representative electrical assembly E of FIG. 1. Bottom section 60 will be exposed along the bottom surface of base section 14 upon full assembly of protector module 10.

Figure 2:
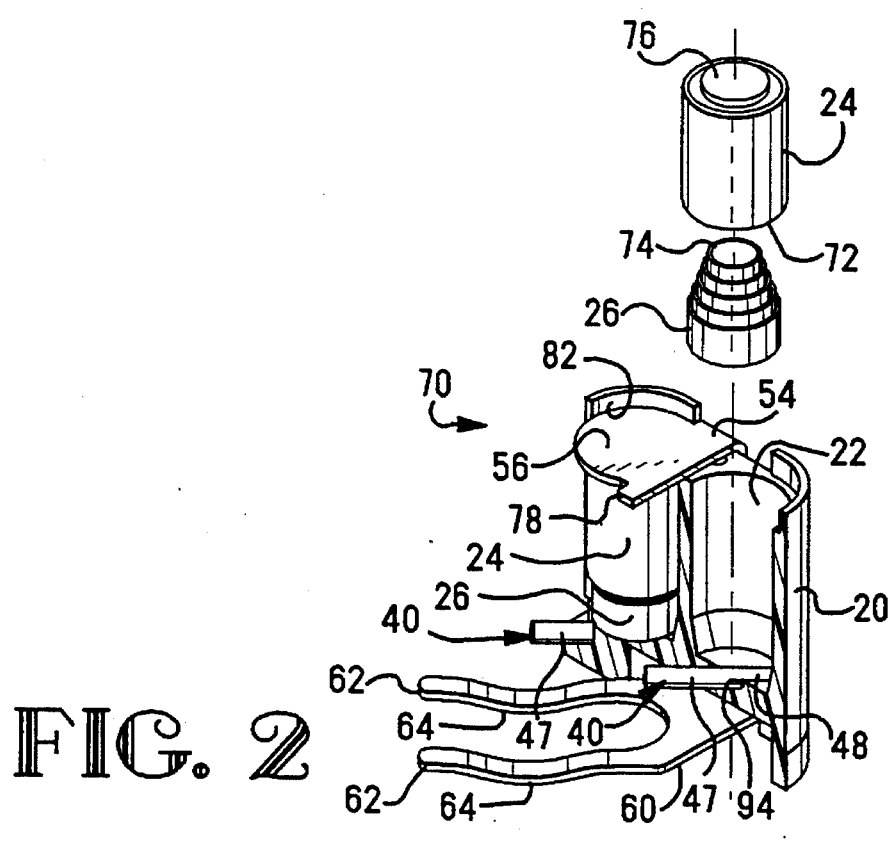
FIGS. 2 and 3 are isometric and section views illustrating a housing section of the module of FIG. 1 having a pair of cavities for receipt of protector elements thereinto.
Figure 3:
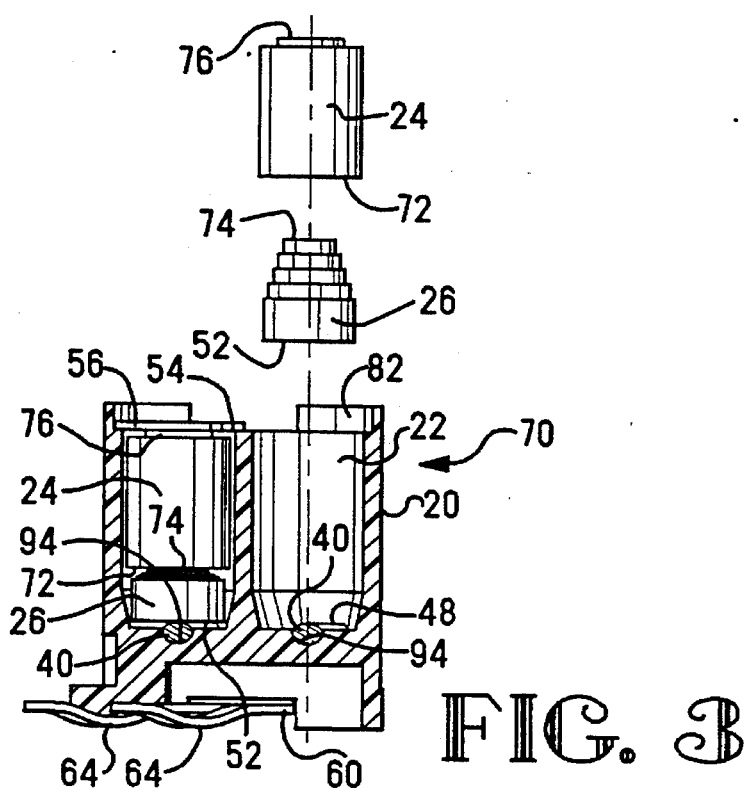

Referring to FIGS. 2 and 3, protector subassembly 70 is illustrated to comprise protector housing section 20 with coil springs 26 in both cavities 22, and protectors 24 positioned thereabove with bottom surfaces 72 engaged with the top portions 74 of coil springs 26. Placement of module ground strap 54 into position on subassembly includes pressing protectors 24 downwardly against the spring bias of coil springs 26 assuring that ground electrodes 76 extending above top portions of the casing of protectors 24 are biased against top section 56 of module ground strap 54 after assembly. Protrusion 78 of top strap section 56 is inserted into slit 80 (see FIGS. 4 and 5) near the top of protector housing section 20 to hold the module ground strap 54 in position in the recessed top 82 of protector housing section 20 after assembly which may thereafter be sealed by potting material. In FIG. 2 grooves 50 are seen along the bottoms of cavities 22 and extend through the housing walls at openings 94 (FIG. 4) with second end sections 48 of via wires 40 shown disposed therealong. In FIG. 3 wires 40 are shown disposed along grooves 50 along the bottoms of cavities 22 to illustrate the compression of coil spring 26 between wires 40 and bottoms 72 of protectors 24 when protector module 10 is fully assembled.

In FIG. 4 (and FIG. 5) terminal housing sections 16 are seen to be integrally joined to a common intermediate section 86 to facilitate molding of a single two-terminal housing member 88. First end sections 42 of via wires 40 have already been inserted through bottom openings 90 (see FIG. 1) before terminals 18 and actuators 32 were inserted into housing sections 16, and intermediate sections 47 of wires 40 are preferably disposed along guide channels 92 molded into the bottom of housing member 88, after which conventional potting material is preferably disposed along the guide channels sealing the via wires and holding them in position. Intermediate sections 47 coextend in parallel laterally from housing member 88 to second end sections 48, ready to be received into openings 94 of as-yet unloaded protector module housing 20.

A mounting flange 96 of protector subassembly 70 extends laterally to fit between the pair of terminal housing sections 16 when protector subassembly 70 is moved laterally toward and adjacent terminal housing sections 16 in a manner receiving second end sections 48 into the corresponding openings 94 near the bottom of cavities 22 which communicate with grooves 50. Referring to FIGS. 1 and 4, housing member 88 is positioned and adhered to base section 14 with annular embossments 98 cooperating with recesses 100 of the bottom surface of member 88 assuredly positioning the terminal housing sections 16 with respect to the base section 14. Mounting flange 96 includes a hole 104 which is aligned with a large embossment-receiving hole 106 of base section 14 and a corresponding hole 108 through intermediate section 86 extending between terminal housing sections 16.

A complete protector module 10 is shown being mounted into an enclosure 110 in FIG. 5, which already has a second protector module 10 already mounted therein along bottom or mounting 112. Embossments 114 extend upwardly from enclosure bottom 112 in mounting regions for each protector module 10 to be received into corresponding holes 116 to facilitate positioning of protector module 10 during mounting. A fastener such as trilobular selftapping screw 118 is used to extend through the aligned holes and be threaded into apertured embossment 120 along bottom 112 of enclosure 110 to secure protector module 10 in the enclosure, and threaded apertured embossment 120 is received into holes 106,108 upon mounting.

An enclosure ground strap 122 is mounted along enclosure bottom 112 to extend from a ground connection with a ground stud 124 of enclosure 110 and having apertures to be fitted over embossments 114,120 for both protector modules 10. A top surface portion 126 of enclosure ground strap 122 adjacent apertured embossment 120 is groundingly engaged under spring bias by contact sections 64 of tines 62 of module ground strap 54 upon completion of the mounting of protector module 10 to enclosure bottom 112, thus completing the necessary ground circuit for functioning of the protectors in the service line circuit. Bottom section 60 of module ground strap 54 is disposed along recess 128 of base section 14 (FIG. 4), and enclosure ground strap 122 is received into recess 130 of base section 14.

A customer cable end and corresponding distribution cable end are then able to be received through cable exit 132 which preferably is grommeted for sealing, and tip and ring conductor wires of each cable able to be inserted into wire-receiving openings 134,136 of each terminal housing section 16. Enclosure 110 also includes a lid (not shown) to complete a sealed assembly after the wires are terminated to the terminals.

A protector 24 as shown is available from Joslyn Electronic Systems Corporation of Goleta, Calif. under the trade identification "Gas Tube and Cannister" Part No. 72220. A spring 26 as shown is available from Connecticut Spring and Stamping Company, Farmington, Conn. under the trade identification volute conical compression spring, Part No. 920408 and is of beryllium copper. Via wires 40 may be tin-plated formed lengths of copper bus wire, and module ground strap 54 and enclosure ground strap 122 may be tin-plated phosphor bronze.

During in-service use the protector elements short out overvoltage surges to ground; upon being subjected to such a surge, a solder element within the protector melts and flows, allowing ground electrode 76 to recede into the casing or outer shell of the protector; coil spring 26 continues to apply spring bias against the bottom 72 of the outer shell and urges it ultimately against ground strap top section 56. The protector outer shell is in electrical engagement with active electrode of the protector and upon engagement with the ground strap establishes a ground of the service line thereby interrupting service to the customer until a replacement protector is inserted into position or until a replacement protector module 10 is connected to the service and distribution lines to reestablish the protected circuits.

Modifications and variations may occur to the embodiment disclosed herein which are within the spirit of the invention and the scope of the claims.

We claim:

1. A terminal block arrangement of the type including a terminal disposed within a housing and having a section exposed and adapted to become electrically connected to an electrical conductor, the arrangement comprising:

a terminal disposed within a housing with a connecting section at least exposed to become electrically connected to an electrical connector;

a groove along a terminal-proximate internal surface of said housing of selected depth and having a groove bottom surface and in communication with a lead-receiving opening into said housing;

terminal-engaging portions of said housing adapted to secure said terminal assuredly in position with a groove-proximate surface of said terminal spaced a selected small distance from said groove bottom; and said terminal being cylindrical and being disposed about a central post within said housing and within an annular cavity therearound, and said groove being defined along an outwardly facing surface of said central post and facing an inner surface of said terminal and extending therealong from said lead-receiving opening in an otherwise closed end of said annular cavity, whereby an uninsulated portion of a conductive lead of appropriate diameter slightly greater than said selected small distance is insertable into said lead-receiving opening and along said groove and upon complete assembly of the terminal block arrangement and uninsulated conductive lead, the uninsulated conductive lead is in compression fit against said groove-proximate surface of said terminal thereby being assuredly commoned to said electrical conductor upon electrical connection of the conductor with said terminal.

2. A terminal block arrangement as set forth in claim 1 wherein said conductive lead is a wire extending to a remote end in electrical engagement with an electrode of an electrical component, enabling electrical connection of said component to said electrical conductor.

3. A terminal block arrangement as set forth in claim 1 wherein said terminal is movable within said housing from a first position to a second position remaining in electrical engagement with said uninsulated conductor lead in both said first and second positions.

4. A terminal block arrangement as set forth in claim 3 wherein said lead-receiving opening includes a flared entrance facilitating receipt of an end of said conductive lead during insertion thereof.

5. A terminal block arrangement of the type including a terminal disposed within a housing and having a section exposed and adapted to become electrically connected to an electrical conductor, the arrangement comprising:

a terminal disposed within a housing with a connecting section exposed through an opening of the housing to receive thereinto a portion of an electrical conductor to become electrically connected thereto upon insertion thereof;

a groove along a terminal-proximate internal surface of said housing of selected depth and having a groove bottom surface and in communication with a lead-receiving opening into said housing; and terminal-engaging portions of said housing adapted to secure said terminal assuredly in position with a groove-proximate surface of said terminal spaced a selected small distance from said groove bottom, and said terminal-engaging portions of said housing also adapted to permit movement of said terminal between first and second positions;

an actuator in operative engagement with said terminal; and an uninsulated portion of a conductive lead of appropriate diameter slightly greater than said selected small distance extends through said lead-receiving opening and is disposed along said groove, whereby the uninsulated conductive lead portion is in compression fit against the groove-proximate surface of the terminal such that the uninsulated conductive lead portion is secured in the terminal block and is assuredly commoned to the electrical conductor by the terminal upon electrical connection of the conductor with the terminal, and the uninsulated conductive lead portion is secured against movement by the groove while the terminal is movable within the housing relative to the lead by the actuator between the first and second positions while remaining in electrical engagement with the lead in both the first and second positions.

6. A terminal block arrangement as set forth in claim 5 wherein said conductive lead is a wire extending to a remote end in electrical engagement with an electrode of an electrical component, enabling electrical connection of said component to said electrical conductor.

7. A terminal block arrangement as set forth in claim 5 wherein said terminal is cylindrical and is disposed about a central post within said housing and within an annular cavity therearound, and said groove is defined along an outwardly facing surface of said central post and facing an inner surface of said terminal and extending therealong from an opening in an otherwise closed end of said annular cavity.

8. A terminal block arrangement as set forth in claim 7 wherein said lead-receiving opening includes a flared entrance facilitating receipt of an end of said conductive lead portion during insertion thereof.

* * * * *